(12) United States Patent
Lindqvist et al.

(10) Patent No.: US 8,380,154 B2
(45) Date of Patent: Feb. 19, 2013

(54) METHOD AND ARRANGEMENT FOR INTERFERENCE MITIGATION

(75) Inventors: Fredrik Lindqvist, Älvsjö (SE); Fredrik Huss, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 284 days.

(21) Appl. No.: 12/941,121

(22) Filed: Nov. 8, 2010

(65) Prior Publication Data
US 2012/0108194 A1    May 3, 2012

Related U.S. Application Data

(63) Continuation of application No. PCT/SE2010/051179, filed on Nov. 1, 2010.

(51) Int. Cl.
*H04B 1/00* (2006.01)
(52) U.S. Cl. .... 455/296; 455/63.1; 455/501; 455/67.13; 375/316; 375/341; 375/346
(58) Field of Classification Search ............... 455/63.1, 455/114.2, 130, 278.1, 296, 501, 67.13; 375/316, 375/341, 346, 347
See application file for complete search history.

(56) References Cited

U.S. PATENT DOCUMENTS

| 6,128,355 A | 10/2000 | Backman et al. | |
|---|---|---|---|
| 2004/0042532 A1* | 3/2004 | Artamo et al. | 375/148 |
| 2006/0039272 A1* | 2/2006 | Sikri et al. | 370/208 |
| 2008/0165720 A1* | 7/2008 | Hu et al. | 370/315 |

FOREIGN PATENT DOCUMENTS
WO    WO 2008/102059    8/2008

OTHER PUBLICATIONS

International Search Report mailed Aug. 1, 2011, in corresponding International Application No. PCT/SE2010/051179.
Written Opinion of the International Search Authority mailed Aug. 1, 2011, in corresponding International Application No. PCT/SE2010/051179.
Shah et al, Narrowband Jammer Resistance for MIMO OFDM, Military Communications Conference, 2008. MILCOM 2008, Nov. 16, 2008, XP031408325.
da Silva et al., Coarse Acquisition Performance of Spectral Encoded UWB Communication Systems in the Presence of Narrow-Band Interference, IEEE Transactions on Communications, vol. 55, No. 7, Jul. 1, 2007, pp. 1374-1384, XP011187482.
(Geoffrey) Li et al., Spatial-Temporal Equalization for IS-136 TDMA Systems with Rapid Dispersive Fading and Cochannel Interference, IEEE Transactions on Vehicular Technology, vol. 48, No. 4, Jul. 1, 1999, pp. 1182-1194, XP011063897.
Vincent et al., Steering Vector Errors and Diagonal Loading, IEE Proceedings: Radar, Sonar & Navigation, Dec. 10, 2004, pp. 337-343, XP006023107.
Lin et al., "On Diagonal Loading for Robust Adaptive Beamforming Based on Worst-Case Performance Optimization", *ETRI Journal*, vol. 29, No. 1, Feb. 2007, pp. 50-58.

\* cited by examiner

*Primary Examiner* — Tuan Pham
(74) *Attorney, Agent, or Firm* — Nixon & Vanderhye P.C.

(57) ABSTRACT

In a method of mitigating interference for received signals in a communication system, receiving S10 a transmitted signal via at least two antenna elements, estimating S20 a channel for the received signals, and estimating S30 a disturbance covariance matrix based on the channel estimate, which estimated disturbance covariance matrix represents received interference plus noise of the received signals. Subsequently, adapting S40 the estimated covariance matrix by enhancing the diagonal elements of the covariance matrix to provide an enhanced covariance matrix, to reduce the spread in eigenvalues of the covariance matrix, and thereby improve the robustness of the covariance matrix. Finally, selectively S50 using IRC and/or MRC to mitigate interference of the received signals, based on at least the channel estimate and on the enhanced covariance matrix, to provide a received signal with improved quality on channels with Doppler frequency.

14 Claims, 10 Drawing Sheets

METHOD AND ARRANGEMENT FOR INTERFERENCE MITIGATION

This application is a continuation of International Application No. PCT/SE2010/051179 filed 1 Nov. 2010, the entire contents of which is hereby incorporated by reference.

TECHNICAL FIELD

The present invention relates to diversity combining of received signals, in particular to methods and arrangements for providing more robust diversity combining in a communication system.

BACKGROUND

Within present day communication systems, the problem of mitigating interference and noise in received signals is a common one. In particular, when a system utilizes multiple receive antennas, the task of providing an accurate interference estimate and optimized throughput becomes essential in order to provide reliable and competitive services. Due to the increased use of the available frequency spectrum, and the ever increasing number of user terminals, the co-channel and adjacent interference becomes a problem. In addition, for fading channels with a user terminal that moves, also Doppler spread becomes an important factor to consider.

Two commonly used methods of mitigating interference by combining received signals from a plurality of receiver antennas in a base station, or in a user terminal, in a communication system are interference rejection combining (IRC) and the even more common maximum ratio combining (MRC).

Interference rejection combining (IRC) enhances the transmission capacity in a communication system by mitigating undesirable co-channel/adjacent interference. This is made possible by estimating and utilizing the so-called spatial correlation of the interfering signals between multiple receiver antenna elements of a receiver. In doing so, the received interference is suppressed by spatial whitening. In the application of communication, the IRC is typically followed by receiver equalization and decoding. An alternative to IRC is maximum ratio combining (MRC) of the antenna signals. The MRC criterion serves to maximize the signal-to-noise ratio (SNR) rather than maximizing the signal-to-interference-plus-noise-ratio (SINR).

As an example, an LTE system employs reference symbols transmitted at known time/frequency resources, i.e., known pilot symbols, from which a SC-FDMA/OFDM receiver can estimate the channel and the spatial covariance matrix of the interference plus noise.

In a system as mentioned above, uplink user signals are allocated in the frequency domain by one or more groups of 12 contiguous subcarriers, i.e., one or more resources blocks. In addition, also on the downlink the resource blocks are allocated in the frequency domain but not necessarily contiguously. Hence, for both uplink and downlink the cell-interference tends to be frequency-dependent. Moreover, adjacent interference due to e.g. leakage from neighboring systems typically interfere more at the frequency band edges. Thus, also the adjacent interference tends to be frequency-dependent.

IRC can be viewed as spatially whitening of the received signals before further processing and combining the antenna signals according to e.g. the MRC criterion. The coefficients of the whitening filter are typically calculated from the estimated disturbance, i.e., the spatial covariance matrix of the interference plus noise. Different criterions such as the minimum means-square error (MMSE) and the optimum combining (OC) have been proposed to compute the IRC coefficients.

Recent research has revealed that it is beneficial to estimate IRC coefficients in the frequency domain on groups of sub carriers in order to reduce the computational complexity compared to more commonly used frequency-bin based IRC. At the same time, this enables frequency-dependent mitigation of co-channel/adjacent interference. The basic concept employs coefficient calculation with interpolation/extrapolation between successive reference symbols (pilot symbols) in order to further reduce the computational complexity.

In order to make IRC a viable solution for communication systems, the customer expects the throughput performance to be at least as good as or better than wideband MRC for interference-limited scenarios, and have similar performance for noise-limited scenarios. With ideal estimates IRC and MRC provide the same (theoretical) quality or throughput (IP) performance for noise limited scenarios. In practice, however the IRC throughput is typically less than with MRC with an implementation according to the above mentioned IRC coefficient estimation on groups of sub-carriers, for noise limited scenarios, due to at least the following issues. When there is a high Doppler frequency due to user equipment movement, the channel estimate will not reflect the actual channel. This will degrade the performance of IRC combining, as it is calculated based on the estimated channel. In addition, for situations with high SNR and high Doppler frequency, residual errors from the channel estimation will be interpreted as interference. This will cause degradations, as the IRC combining will try to suppress the (self-made) estimated interference.

This problem can to some extent be mitigated by the introduction of an MRC/IRC threshold algorithm that selects MRC/IRC dependent on the interference scenario. In brief, according to prior art [1], a receiver with both IRC and MRC functionality further comprises a threshold functionality. This threshold functionality evaluates the interference of the received signals and selects one of IRC and MRC based on the result of that evaluation. If the interference of the received signal meets or exceeds a predetermined interferences threshold, the receiver utilizes IRC to mitigate the interference e.g. the signal is determined to be interference limited. However, if the interference of the received signal does not exceed or meet the predetermined threshold the receiver utilizes MRC to mitigate the interference e.g. the signal is determined to be noise limited.

However, as already mentioned, the above mentioned prior art solution can be further improved for scenarios with high SNR and high Doppler frequencies, due to the erroneous interpretation of residual errors from the channel estimation as interference.

Due to the above-mentioned problems, there is a need for rendering the IRC/MRC threshold algorithm less sensitive to the influence of Doppler induced residual error in the channel estimates.

SUMMARY

The present disclosure relates to diversity combining in communication systems.

An aim of the present disclosure is to provide methods and arrangements for improving the robustness of diversity combining for scenarios with high SNR and high Doppler frequencies.

The present disclosure presents embodiments of a method of mitigating interference for received signals in a communication system. Initially, a transmitted signal is received via at least two antenna elements, a channel is estimated for the received signals, and a disturbance covariance matrix is estimated based on the channel estimate. The estimated disturbance covariance matrix represents the received interference plus noise of the received signals. Subsequently, the estimated covariance matrix is adapted by enhancing the diagonal elements of the covariance matrix to provide an enhanced covariance matrix, which reduces the spread in eigenvalues of the covariance matrix, and thereby improves the robustness of the covariance matrix. Finally, IRC and/or MRC are selectively used to mitigate interference of the received signals, based on at least the channel estimate and on the enhanced covariance matrix, to provide a received signal with improved quality on channels with Doppler frequency.

The present disclosure further discloses embodiments of an arrangement in a communication system. The arrangement comprises a receiver configured to receive a signal via at least two antenna elements, a channel estimator configured to provide a channel estimate of the received signals, and disturbance estimator configured to provide an estimate of a disturbance covariance matrix. The estimated disturbance covariance matrix represents interference plus noise of the received signals. In addition, the arrangement includes an adaptation unit configured to adapt the provided covariance matrix estimate by enhancing the diagonal elements of the provided covariance matrix to provide an enhanced covariance matrix, to reduce the spread in the eigenvalues of the covariance matrix, and thereby improve the robustness of the covariance matrix. Finally, the arrangement includes an IRC/MRC selector configured to selectively using IRC and/or MRC to mitigate interference of the received signals, based on at least the channel estimate and on the enhanced covariance matrix, to provide a received signal with improved quality on channels with Doppler frequency.

Advantages of the present invention include providing a more robust diversity scheme in a communication system. By enhancing the disturbance covariance matrix, the risk of interpreting channel estimate artifacts caused by high SNR and high Doppler frequency as interference is reduced.

BRIEF DESCRIPTION OF THE DRAWINGS

The invention, together with further objects and advantages thereof, may best be understood by referring to the following description taken together with the accompanying drawings, in which.

ABBREVIATIONS

AWGN Additive White Gaussian Noise
DL Downlink
EPA Enhanced Pedestrian A
INR Interference to Noise Ratio
IRC Interference Rejection Combining
LTE Long Term Evolution
MIMO Multiple Input Multiple Output
MRC Maximum Ratio Combining
OC Optimum Combining
OFDM Orthogonal Frequency Division Multiplexing
PUSCH Physical Uplink Shared Channel
RB Resource Block
RS Reference Symbol (pilot symbol)
SC-FDMA Single Carrier Frequency Division Multiple Access
SINR Signal to Interference plus Noise Ratio
SNR Signal to Noise Ratio
UL Uplink

DETAILED DESCRIPTION

The present invention will be described with relation to an LTE system, however it is equally applicable to similar systems that employ a covariance matrix estimate, as e.g. a typical MIMO (multiple-input-multiple-output) or SIMO (single-input-multiple output) receiver. In other words, systems where diversity combining is utilized to mitigate interference and noise in received signals. Such systems typically employ multiple receiving antennas or antenna arrangements, and combine the signals received at those multiple antennas in various ways to achieve a diversity gain.

In the present disclosure, the specific problem of Doppler frequency and high SNR for received signals is recognized and dealt with. It is recognized, by the inventors, that for a user terminal moving at a certain velocity, the channel estimates of received signals from that user terminal will be affected by the Doppler frequency and result in certain artifacts in the disturbance covariance matrix. In particular, the artifacts when reaching a high enough value will be detected as interference and consequently the signal will be subjected to interference mitigation e.g. IRC. This will cause deterioration in the quality or throughput of the received signal in a noise limited scenario. In short, a non-interference limited signal might be erroneously detected as being interference limited and put through IRC instead of MRC, thus causing degradation in the received signal if non-ideal channel estimates are used. An aim of the present invention is therefore to provide methods and arrangements that make the covariance matrix less susceptible to those errors e.g. more robust and in the result in an increased quality and/or throughput of the received signal(s).

Figure 1:
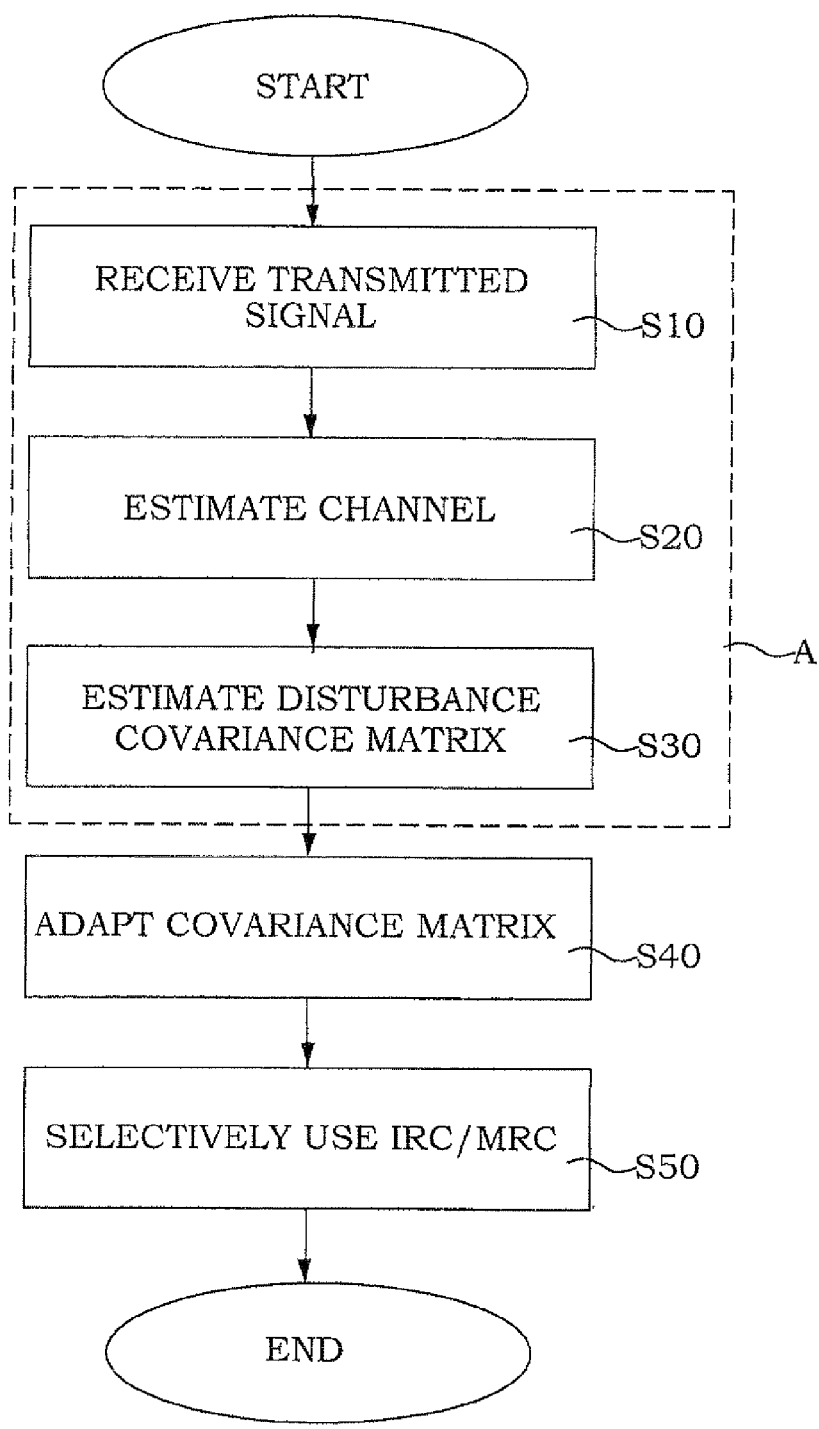
FIG. 1 is an illustration of an embodiment of a method according to the present disclosure.

With reference to FIG. 1, an embodiment of a method of mitigating interference for received signals in a communication system will be described. Initially, and according to known measures, a transmitted signal is received S10 at two or more antennas or antenna elements in a node in the communication system. Subsequently, a channel is estimated S20 for the received signals. Then a disturbance covariance matrix is estimated S30 based on the channel estimate, which estimated disturbance covariance matrix represents the received interference plus noise of the received signals. Then, the estimated covariance matrix is adapted S40 by enhancing the diagonal elements of the estimated covariance matrix to provide an enhanced covariance matrix. The adaptation is performed in such a manner as to reduce the spread in the eigenvalues of the covariance matrix, and thereby improve the robustness of the covariance matrix. Finally, IRC and/or MRC is selectively utilized S50 to mitigate interference of the received signals, based on at least the channel estimate and on the enhanced covariance matrix. Thereby a received signal with improved quality or throughout on channels with considerable Doppler frequency is provided.

Eigenvalues are a well known concept in mathematics, wherein given a linear transformation A e.g. matrix A, a non-zero vector x is defined to be the eigenvector of the transformation if it satisfies the eigenvalues equation $Ax = \lambda x$ for some scalar $\lambda$. In this situation, the scalar $\lambda$ is called an eigenvalues of A corresponding to the eigenvector x. For a diagonal matrix, i.e. a matrix with all non-diagonal elements equal to zero, the eigenvalues are equal to the diagonal elements of the matrix.

In the field of adaptive beam formers [2], a similar concept has been exploited and denoted diagonal loading. The idea behind Diagonal Loading (DL) is to adapt a covariance matrix by adding a displacement value to the diagonal elements of the estimated covariance matrix. In short, a diagonal matrix is added to that covariance matrix.

In order to provide a thorough understanding of the terminology and notation of the present invention, a further description of the assumptions and system models used will follow below.

Figure 2:
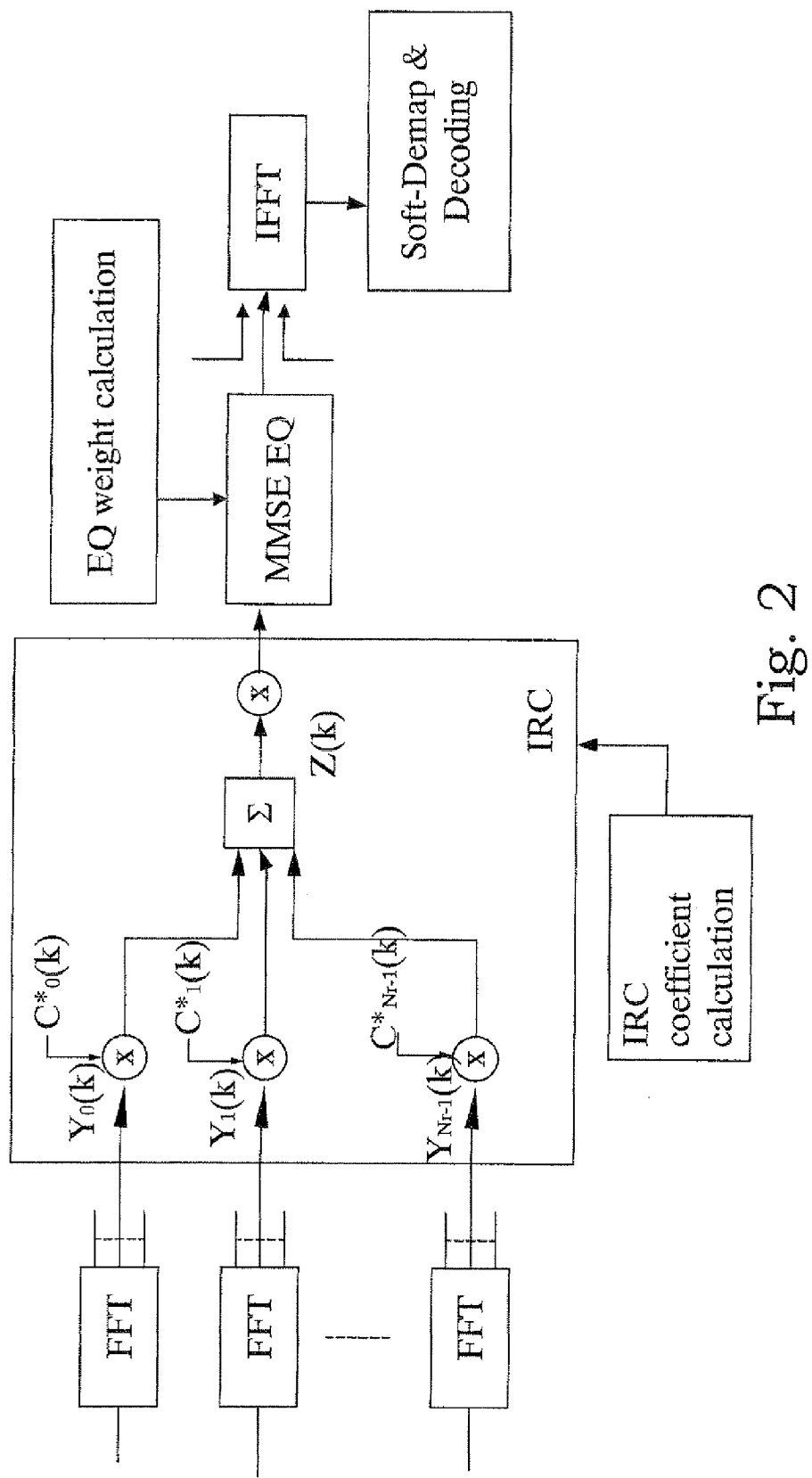
FIG. 2 is an illustration of a system in which the present disclosure can be utilized.

With reference to FIG. 2, consider an arrangement or receiver system comprising Nr antennas or antenna elements, each such antenna or antenna element receiving a signal for a considered user at a subcarrier frequency k. The received frequency domain spatial vector of size $N_r \times 1$ for the considered user at frequency k is defined by $\overline{Y}(k)=[Y_0(k) Y_1(k) \ldots Y_{N_r-1}(k)]^T$. The corresponding spatial channel vector $\overline{H}(k)$ is defined as $\overline{H}(k)=[H_0(k) H_1(k) \ldots H_{N_r-1}(k)]^T$. With this notation, the received frequency domain spatial vector can be expressed according to Equation (1) below as $$\overline{Y}(k) = \overline{H}(k)X(k) + \overline{V}(k) + \overline{W}(k) = \overline{H}(k)X(k) + \overline{D}(k), \quad (1)$$

where X(k) denotes the transmitted signal component (scalar value) for subcarrier k and $\overline{D}(k)=[D_0(k) D_1(k) \ldots D_{N_r-1}(k)]^T$ is the total received spatial disturbance vector containing interference $\overline{V}(k)$ plus noise $\overline{W}(k)$ at all $N_r$ receiver antennas, i.e., $\overline{D}(k) = \overline{V}(k) + \overline{W}(k)$. It is, according to a further embodiment, fairly straight forward to generalize the above described model to multiple transmitted signals e.g. in MIMO systems.

The output from the antenna combining shown in FIG. 2 is denoted by Z(k), for subcarrier k, and can be expressed by the following inner-product according to Equation (2) below $$Z(k) = \overline{C}^H(k)\overline{Y}(k) = \sum_{n=0}^{N_r-1} C_n^*(k) Y_n(k), \quad (2)$$

where the combining coefficient vector for subcarrier k is denoted by $\overline{C}(k)=[C_0(k) C_1(k) \ldots C_{N_r-1}(k)]^T$ and where superscript $^H$ denotes the Hermitian transpose and * is the complex conjugate. Thus, the total received signal after the combining can be written as Equation (3) below $$Z(k) = \overline{C}(k)\overline{Y}(k) = \overline{C}^H(k)\overline{H}(k)X(k) + \overline{C}^H(k)\overline{D}(k) \quad (3)$$

In the following sections the two commonly used combining strategies IRC and MRC are reviewed, leading to slightly different expressions for the coefficient vector $\overline{C}$. For simplicity reasons the subcarrier index k is left out in the following.

It is typically assumed that the AWGN corresponds to thermal noise in the receiver with mean value zero, i.e., $E\{\overline{W}\}=\overline{0}$ and the covariance matrix $Q_W$ is determined according to Equation (4) below $$Q_W = E\{\overline{W}\overline{W}^H\} = \sigma_W^2 I, \quad (4)$$

of size $N_r \times N_r$. The interference is represented by the complex Normal distribution with zero mean vector, $E\{\overline{V}\}=\overline{0}$, and covariance matrix $Q_V$ according to Equation (5) below $$Q_V = E\{\overline{V}\overline{V}^H\} \quad (5)$$

It is thus assumed that $\overline{V}(k) \sim CN(\overline{0}, Q_V)$.

Furthermore, it is assumed that the received signal, the interference, and the spatially white noise are all mutually uncorrelated. This implies that the covariance matrix $Q_D$ is determined according to Equation (6) below $$Q_D = E\{\overline{D}\overline{D}^H\} = Q_V + \sigma_W^2 I, \quad (6)$$

and the covariance matrix $Q_Y$ is determined according to Equation (7) below $$Q_Y = E\{\overline{Y}\overline{Y}^H\} = E\{|X|^2\}\overline{H}\overline{H}^H + Q_D = \sigma_X^2 \overline{H}\overline{H}^H + Q_D, \quad (7)$$

where $\sigma_X^2$ denotes the transmit power and $E\{X\}=0$.

As mentioned previously, for both IRC and MRC the spatial channel frequency response vector $\overline{H}$ and the disturbance covariance matrix $Q_D$ have to be estimated. Assuming that the estimated spatial channel frequency response $\widetilde{H}$ contains an additive error $\overline{H}_E$ according to Equation (8) below $$\widetilde{H} = \overline{H} + \overline{H}_E \quad (8)$$

where $\overline{H}_E$ denotes a complex valued channel estimation error. This error stems from residual noise in the channel estimate and from modelling errors introduced by the underlying IRC/MRC assumptions. For channels with high Doppler-frequency the impact of this model error is significant.

Subsequently, the estimated spatial disturbance vector based on non-ideal channel estimation yields Equation (9)

$$\widetilde{D} = \overline{Y} - \widetilde{H}X = \overline{H}X + \overline{D} - \widetilde{H}X = \overline{D} - \overline{H}_E X \quad (9)$$

Consequently, and since the signal and the disturbance are mutually uncorrelated, the resulting disturbance covariance matrix $\hat{Q}_D$ can be expressed as Equation (10)

$$\hat{Q}_D = E\{\widetilde{D}\widetilde{D}^H\} = E\{(\overline{D} - \overline{H}_E X)(\overline{D} - \overline{H}_E X)^H\} = Q_D + \sigma_X^2 \overline{H}_E \overline{H}_E^H \quad (10)$$

In addition, in the case of IRC the IRC coefficient vector $\hat{\overline{C}}_{IRC}$ that ideally maximizes the SINR subjected to the constraint of unit gain in the signal direction (target-direction) can be expressed as Equation (11)

$$\hat{\overline{C}}_{IRC} = \frac{\hat{Q}_D^{-1} \hat{\overline{H}}}{\hat{\overline{H}}^H \hat{Q}_D^{-1} \hat{\overline{H}}} \quad (11)$$

which indicates the dependence on the estimated quantities. Accordingly, any residual errors in either or both of the channel estimates and the disturbance covariance matrix estimate will typically affect the IRC coefficient calculation negatively.

Figure 3:
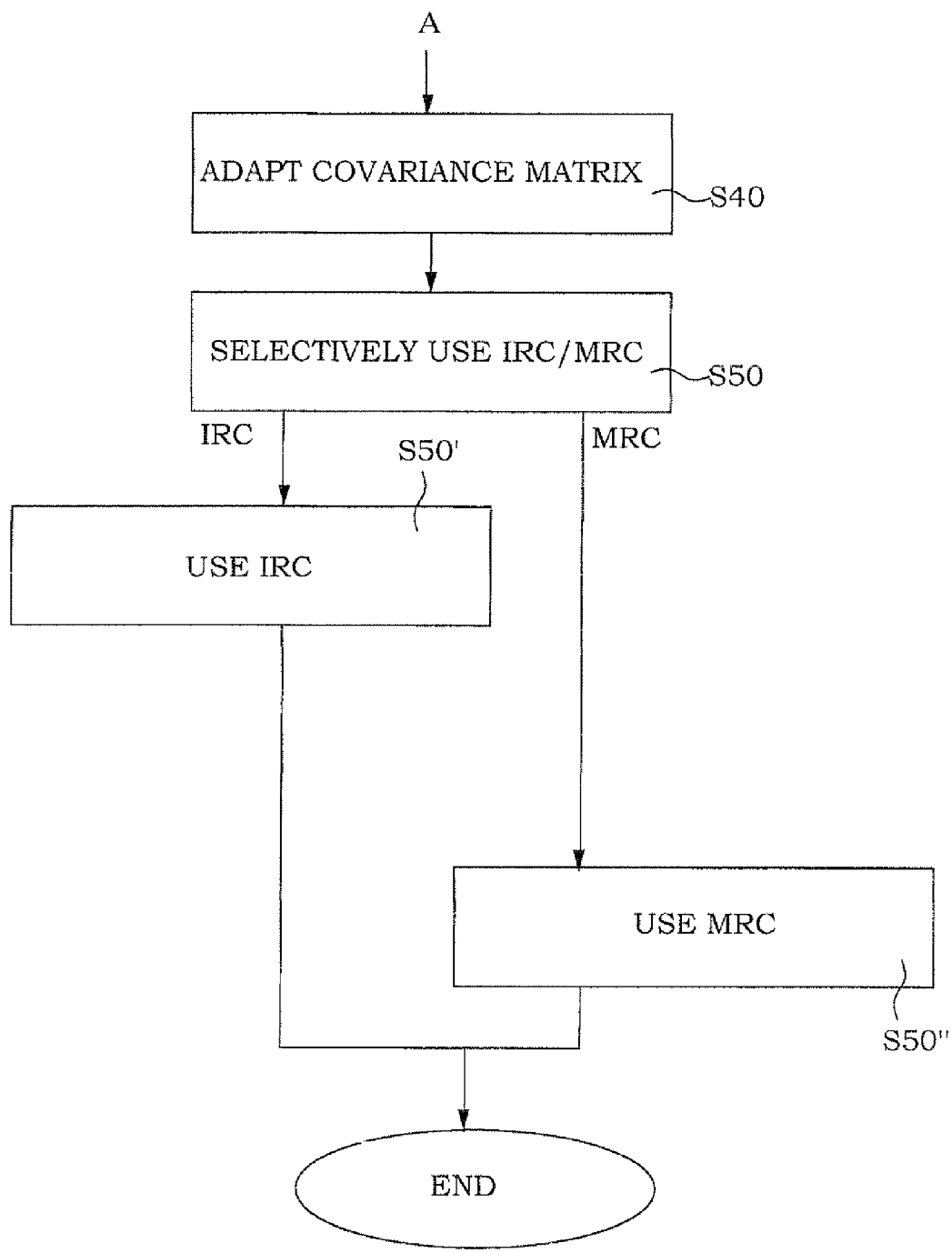
FIG. 3 is an illustration of a further embodiment of a method according to the present disclosure.

The method shown in FIG. 1 is further illustrated in FIG. 3, where the selective use of IRC/MRC S50 is shown with emphasis on the two separate steps of selecting and using IRC S50' or selecting and using MRC S50".

Figure 4:
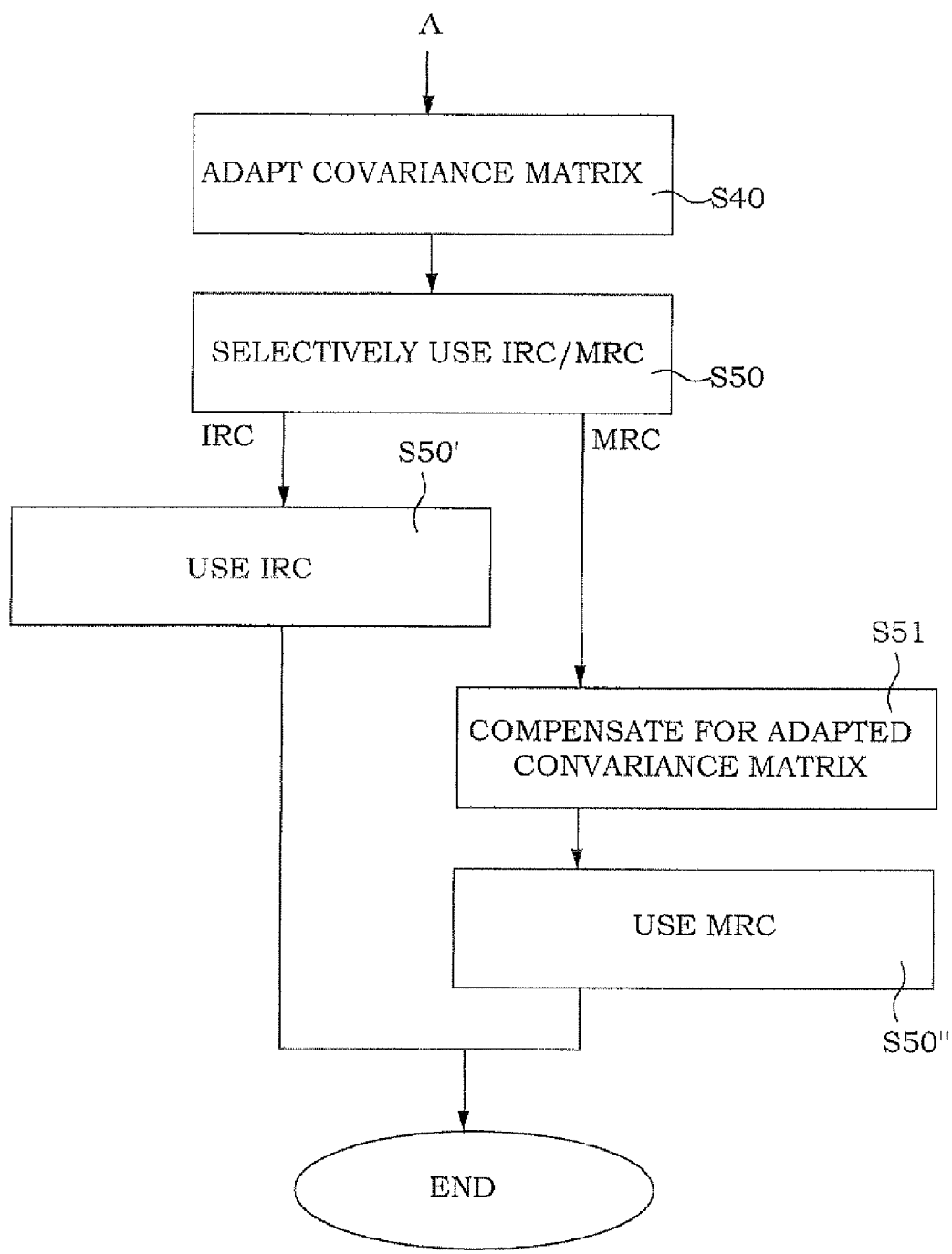
FIG. 4 is an illustration of a further embodiment of a method according to the present disclosure.

With reference to FIG. 4, a further embodiment of a method according to the present invention will be described. In the same manner as the basic embodiment a signal is received S10 on two or more antennas or antenna elements, a channel estimate S20 is provided, and a disturbance covariance matrix is estimated S30 for the received signals. Next, the covariance matrix is adapted S40. Based on the adapted covariance matrix IRC or MRC are selectively used S50. The selection of IRC or MRC is based on the adapted or enhanced covariance matrix and the estimated channel. In particular, a comparison between the diagonal and non-diagonal elements of the adapted covariance matrix is performed. If the comparison indicates an interference-limited scenario, then IRC is selected and applied to the signals. However, if the comparison indicates a noise limited scenario, MRC is applied. In the case of MRC, it is necessary to compensate S51 for the adapted covariance matrix prior to actually completing MRC.

Figure 5:
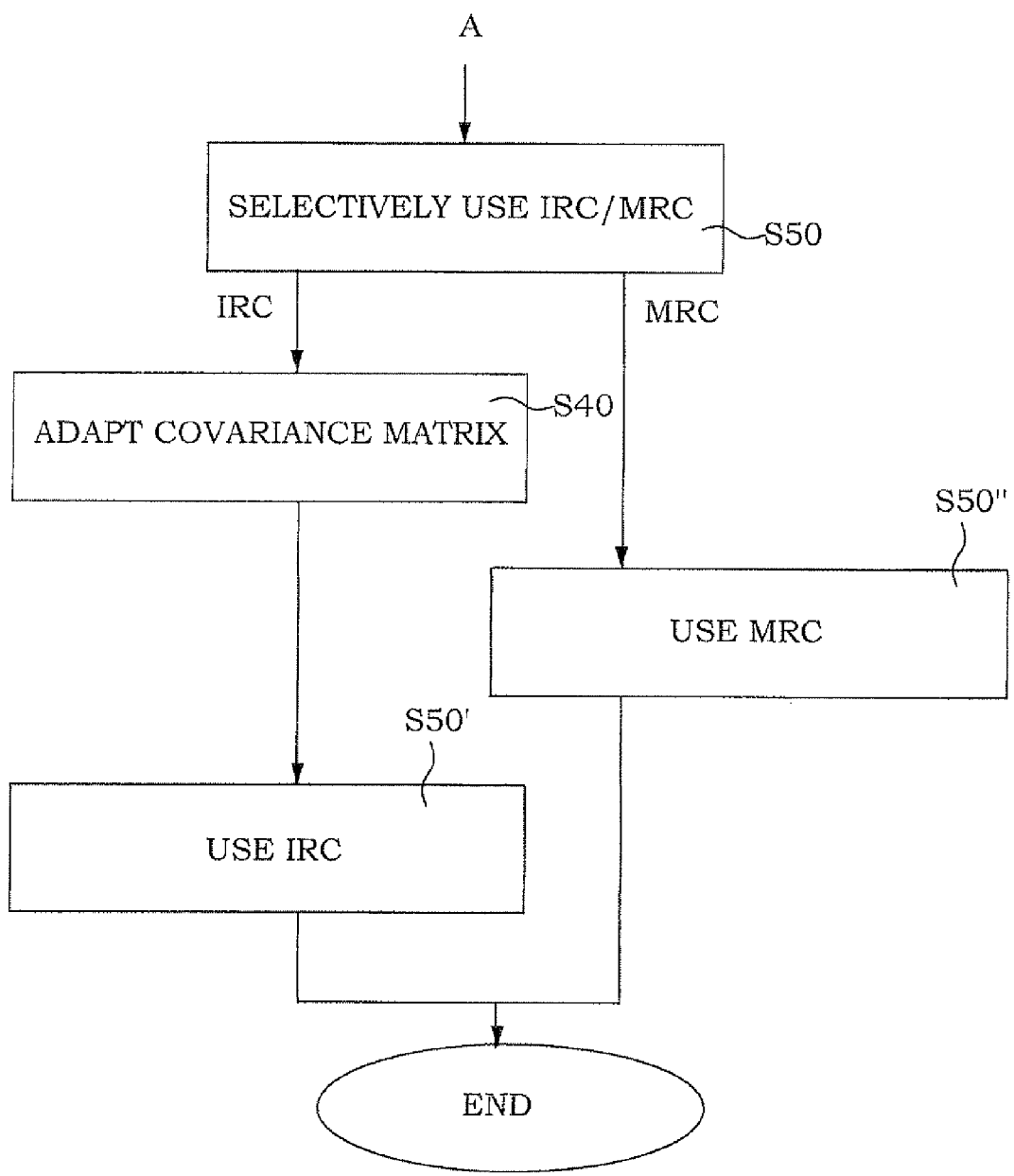
FIG. 5 is an illustration of a further embodiment of a method according to the present disclosure.

In order to avoid the additional compensation for the case of MRC, a further embodiment will be described with reference to FIG. 5. In this case, the selection of IRC/MRC S50 is performed prior to adapting the estimated covariance matrix. If IRC is selected, then the estimated covariance matrix is adapted S40 and IRC S50' is applied based on the adapted estimated covariance matrix. If MRC is selected, then the un-adapted estimated covariance matrix is used before the MRC is applied S50".

Figure 6:
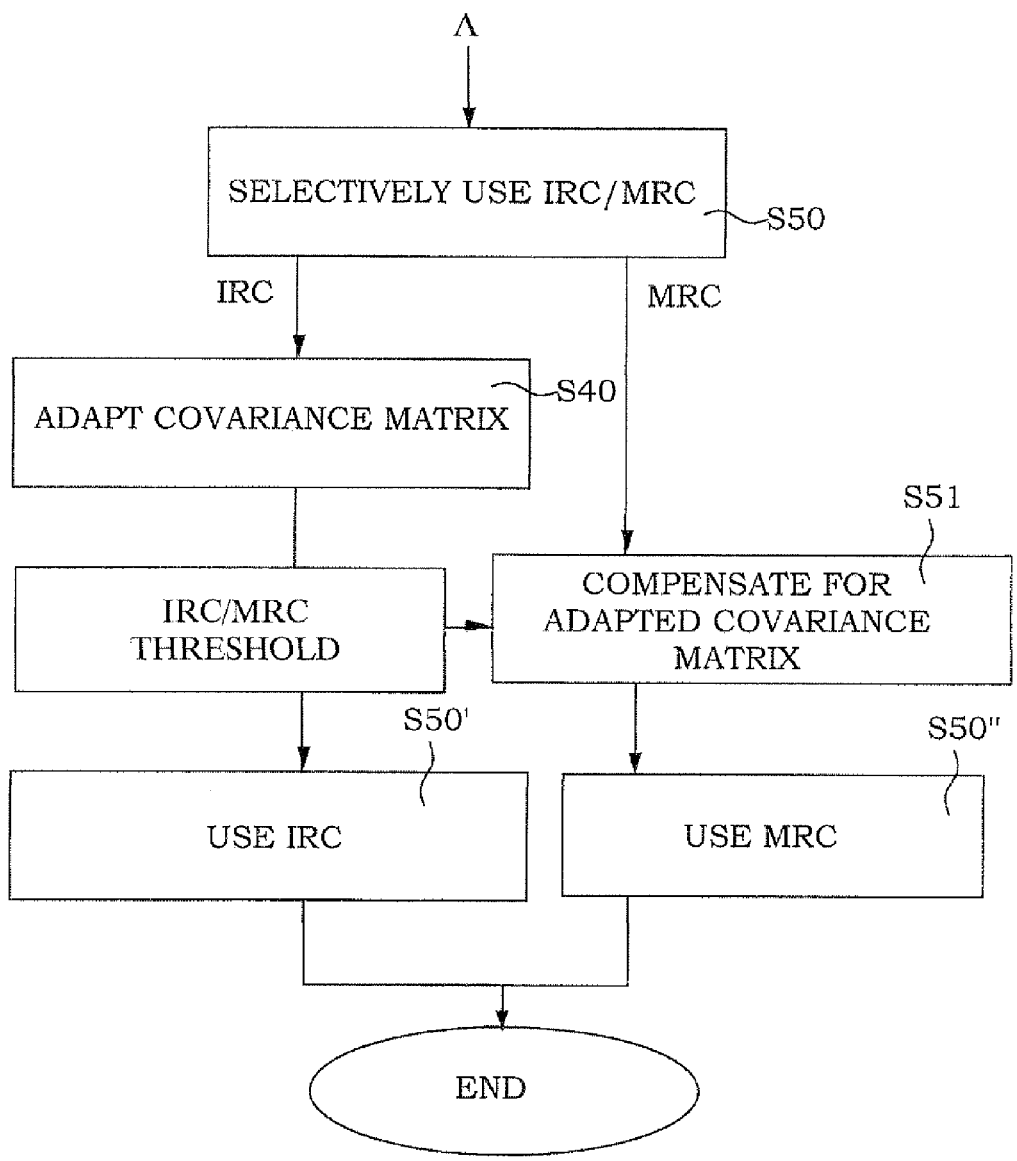
FIG. 6 is an illustrate of yet another embodiment of a method according to the present disclosure.

According to yet a further embodiment, with reference to FIG. 6, prior to applying IRC an additional check can be performed and potentially MRC is selected and used S50" instead. In which case, it is necessary to first compensate S51 for the adapted estimated covariance matrix, before performing the MRC processing.

Figure 7:
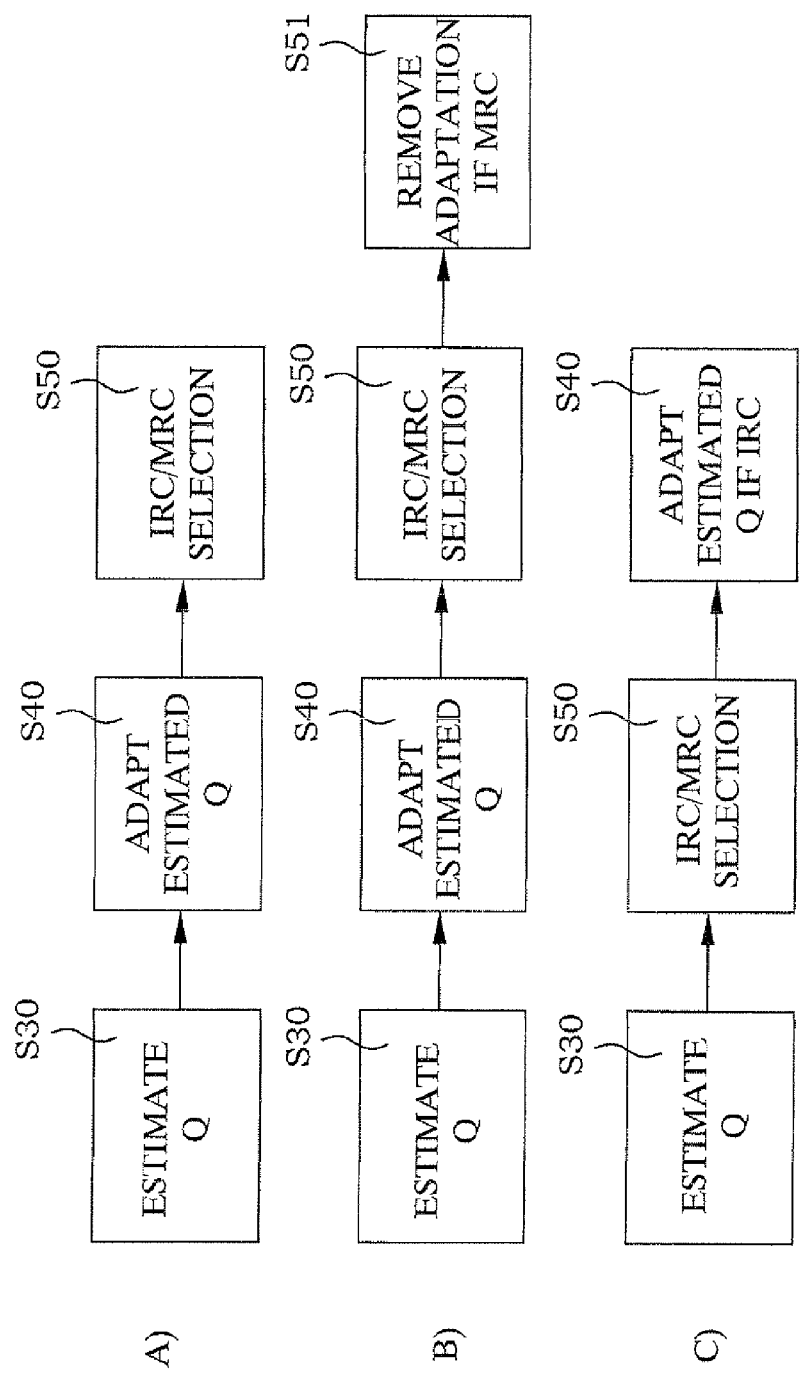
FIG. 7 is an illustration of embodiments of the present disclosure.

A summary of at least three of the potential manners, denoted A, B, and C, in which to apply the adaptation step is illustrated in FIG. 7.

In alternative A, the enhancement or adaptation is performed on the estimated covariance matrix before the IRC/MRC threshold algorithm is executed. This corresponds to the embodiment described with relation to FIG. 1

In alternative B the same order of execution as in alternative A is performed, with the exception that the enhancement is removed in case MRC is selected. This corresponds to the embodiment described with relation to FIG. 4

Finally, in alternative C the enhancement or adaptation is executed after the IRC/MRC threshold algorithm and only applied for the case of IRC selection. This corresponds to the embodiment described with relation to FIG. 5.

From a set of simulations of alternatives A, B, and C it is concluded that alternative B is the most promising as explained next. With alternative A, a slight reduction in throughput can be observed in noise-limited scenarios as the adaptation in terms of displacement values are also added for MRC. With alternative C, self-made interference due to the channel estimation errors may impact the performance for certain channels. This means that in a noise-limited scenario with high SNR, the MRC/IRC threshold algorithm tends to select IRC. This result in a small throughput loss compared to alternative B and MRC.

In alternative B, the displacement values are removed in case MRC is detected. Another option is to modify the MRC/IRC threshold algorithm so that the adaptation is only applied for IRC. This has the advantage that the MRC/IRC selection is based on the same quantities that are later used in the MRC or IRC combining, which simplifies the implementation.

The adaptation of the estimated covariance matrix, according to the present disclosure, can be illustrated by Equation 12 below $$\tilde{Q}_D = Q_D + \Delta \quad (12)$$

where $\tilde{Q}_D$ is the adapted or enhanced estimated covariance matrix, $Q_D$ is the estimated covariance matrix, and $\Delta$ is the diagonal matrix representing the displacement value(s) to be added to the diagonal elements of the estimated covariance matrix in order to enhance the estimated covariance matrix.

In order to achieve a beneficial influence of the adaptation of the estimated covariance matrix, it is necessary to pay some attention to the selection of the displacement values. In general, a too large level of the displacement values may introduce an error that is contra productive. A too small level of the displacement values may not improve the result at all. Thus, there exists a trade-off.

According to a basic embodiment of the present disclosure, the displacement values are selected proportional to the signal power calculated from the channel estimates. The channel estimates could be either wideband or frequency selective. In other words, the elements of the displacement matrix $\Delta$ can be selected according to Equation (13)

$$[\Delta]_{n,n} = \delta \frac{1}{M} \sum_{k=0}^{M-1} |\hat{H}_n(k)|^2, n = 0, 1, \ldots, N_r - 1 \quad (13)$$

where $[\Delta]_{i,j}$ denotes the element of the ith row and jth column, and $\delta$ is a fixed constant that constitute a design parameter that scales the estimate of the received signal power. Here, $N_r$ denotes the number of receiver antennas, $\hat{H}_n(k)$ is the channel estimate on antenna n for subcarrier k, and M denotes the total number of subcarriers allocated for the considered user. Note that the off-diagonal elements of $\Delta$ are zero.

For the case of a plurality of signals, the displacement values can be set for each signal. Potentially, and for computational simplicity, it is possible to use one and the same displacement value for all diagonal elements. However, preferably a separate displacement value for each diagonal element is selected. According to a further embodiment, the displacement value is selected based on the received power of one signal. Thus, a step of selecting which signal to base the displacement value upon has to be performed.

In another embodiment, enhancement of the estimated covariance matrix can be based on the estimated Doppler frequency. This will compensate for that the channel estimate becomes more unreliable at higher Doppler frequencies.

In a more advanced embodiment, the enhancement of the estimated disturbance covariance matrix can be based on a combination of received power and Doppler frequency. Consequently, the elements of the displacement matrix can be selected according to Equation (14)

$$[\Delta]_{n,n} = \delta \beta \frac{1}{M} \sum_{k=0}^{M-1} |\hat{H}_n(k)|^2, n = 0, 1, \ldots, N_r - 1 \quad (14)$$

where $\beta$ is an estimate of the Doppler frequency and $\delta$ is a design parameter that scales the estimate.

It should be emphasized that the above-mentioned embodiments and algorithms thereof utilizes estimates that are already available in a typical LTE receiver. However, it is possible to apply the embodiments of this disclosure in other cases as well, in which case the necessary estimates need to be provided elsewhere.

Figure 8:
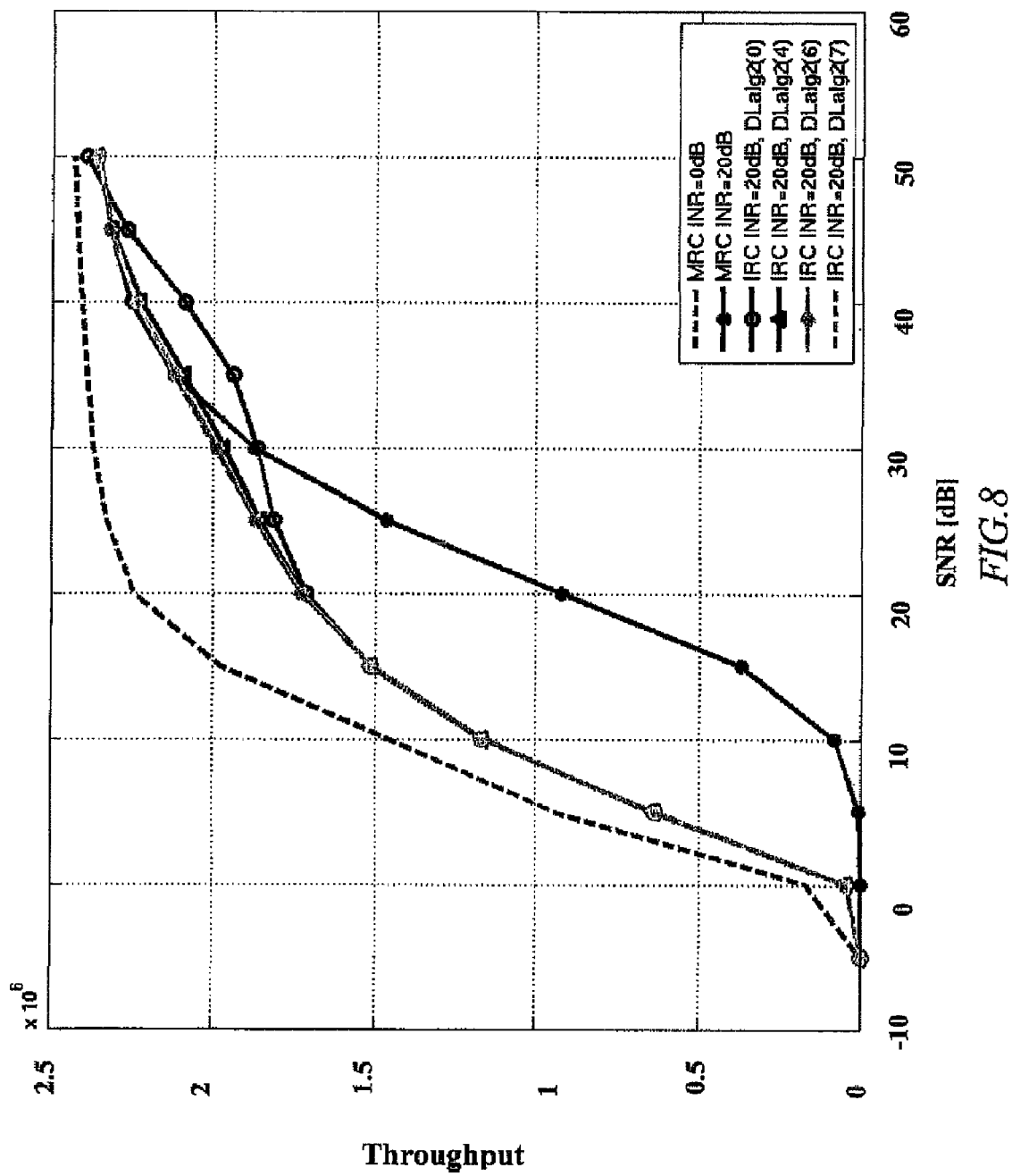
FIG. 8 is a diagram illustrating a comparison between prior art and embodiments of the present disclosure.

As an example, the performance with different amounts of enhancement or diagonal loading according to the present disclosure is shown in FIG. 8. The example illustrates an EPA channel with a 300 Hz Doppler frequency. The solid curve with unfilled circles shows the throughput as a function of SNR with a fixed INR=20 dB for IRC without any added displacement values (or Diagonal Loading) e.g. $\delta$=0. For this case there is a clear degradation for SNR>20 dB. For reference the performance for MRC with INR=0 dB (dotted line) and INR=20 dB (solid line with filled circles) are shown.

One idea behind the enhancement of the present disclosure or Diagonal Loading is to add a displacement value to the diagonal elements of the estimated covariance matrix. In doing so, the spread e.g. variance of the eigenvalues is reduced and thereby improves the robustness. This is further explained below, for the interested reader.

The reduction in eigenvalue spread or variance can be illustrated by letting $\Delta=\delta I$, for a real value $\delta$>0, where z is the unit matrix, and noting that the nth eigenvalue of a N×N Hermitian positive definite matrix A with this displacement yields Equation 15 below $$\mathrm{eig}(A+\delta I)_n = \tilde{\lambda}_n = \lambda_n + \delta, \text{ for } n=0,1,\ldots,N-1, \quad (15)$$

where $\lambda_n$ is the corresponding eigenvalue of matrix A.

If the relative eigenvalue spread $\Delta\lambda$ for matrix A is defined by Equation 16 below $$\Delta\lambda = \frac{\lambda_{max} - \lambda_{min}}{\lambda_{max}}, \quad (16)$$

then the relative eigenvalue spread $\Delta\tilde{\lambda}$ for matrix $(A+\delta I)$ yields Equation 17

$$\Delta\tilde{\lambda} = \frac{\tilde{\lambda}_{max} - \tilde{\lambda}_{min}}{\tilde{\lambda}_{max}} = \frac{\lambda_{max} - \lambda_{min}}{\lambda_{max} + \delta} < \Delta\lambda, \quad (17)$$

since $\delta > 0$ and $\lambda_n \geq 0 \forall n$.

Thus, the relative eigenvalue spread can be reduced by the displacement values according to the present disclosure, which adds a bias to all eigenvalues. As the eigenbeam corresponding to an interferer typically has the largest eigenvalue, a small bias would (theoretically) have little or no negative impact.

Figure 9:
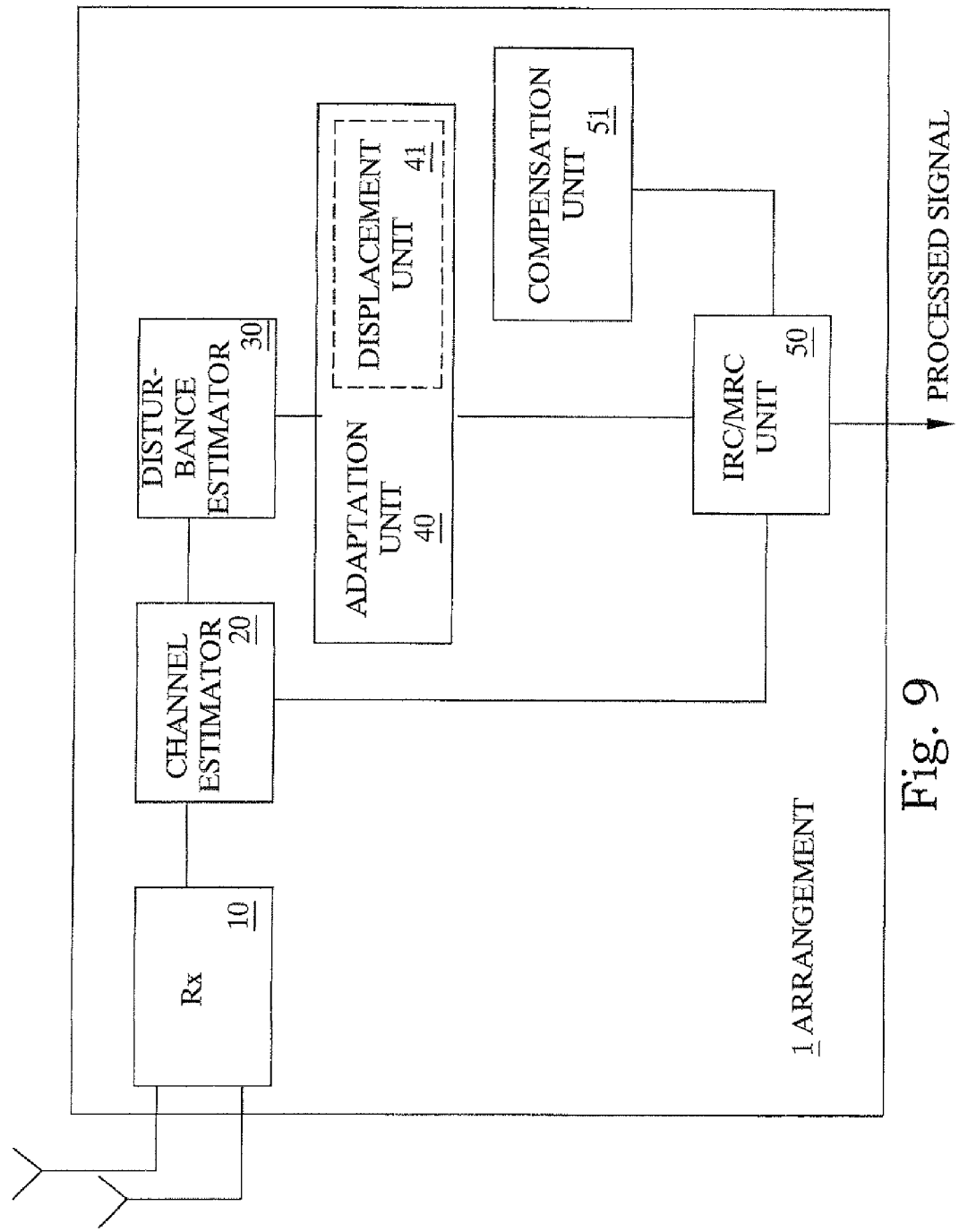
FIG. 9 illustrates a block diagram of an embodiment of an arrangement according to the present disclosure.

With reference to FIG. 9, an arrangement 1 in a node according to the present disclosure will be described. The arrangement 1 can be included in a user terminal or base station or some other receiver unit. According to known measures, the arrangement 1 includes a receiver unit 10 for receiving transmitted signals. The receiver unit 10 comprises at least two antennas or antenna elements in order to enable antenna diversity. The at least two antennas or antenna elements can also comprise two antenna ports for connecting to two antennas or antenna elements for receiving signals. In addition, the arrangement 1 includes a channel estimator unit 20 configured for providing a channel estimate for each received signal, and a disturbance estimator unit 30 for providing an estimate of a disturbance covariance matrix of the channel estimate, which estimated disturbance covariance matrix represents the received interference plus noise. Further, the arrangement 1 includes an adaptation unit 40 configured for adapting the estimated covariance matrix by modifying the diagonal elements of the estimated covariance matrix to provide an enhanced covariance matrix. The enhancement or adaptation is performed such as to reduce the spread in the eigenvalues of the estimated covariance matrix, and thereby improve the robustness of the covariance matrix. Finally, the arrangement 1 includes an IRC/MRC unit 50 for selectively using IRC and/or MRC to mitigate interference of the received signals, based on at least the provided channel estimate and on the enhanced covariance matrix, to provide a received signal with improved throughput.

According to a further embodiment of the present disclosure, the adaptation unit 40 is configured to provide a diagonal displacement matrix e.g. diagonal elements $\Delta$ to be added to the estimated disturbance covariance matrix. The adaptation unit 40 further comprises an optional displacement determinator unit 41 The optional displacement determinator unit 41 is adapted to, according to one embodiment; provide a displacement matrix based on a received power of the received signals. According to another embodiment, the optional displacement determinator unit 41 is adapted to provide a displacement matrix based on an estimated or actual Doppler frequency of the received signals. According to yet a further embodiment, the optional displacement determinator unit 41 is adapted to provide the displacement matrix based on both a received power and Doppler frequency.

As mentioned in relation to the embodiments of a method according to the present disclosure, in case applying the enhancement of the estimated disturbance covariance matrix prior to selectively using IRC or MRC, it may be necessary to compensate for the enhancement in the case of MRC. Consequently, an embodiment of an arrangement 1 according to the present disclosure includes a compensation unit 51 for compensating for applied enhancement. The unit 51 is adapted to remove the added displacement values from the enhanced covariance matrix if an enhancement has been performed and MRC has been selected. Thus, ensuring that the processed signal after application of MRC will not experience any degradation caused by the displacement values.

In addition, the enhancement unit is configured to, in the case of a selected MRC procedure and initial application of enhancement, further compensating the resulting processed signal for the applied enhancement. Typically, this is enabled by subtracting the displacement matrix.

The arrangement 1 can be provided in a node in communication system or in a user terminal or similar device in the system.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Figure 10:
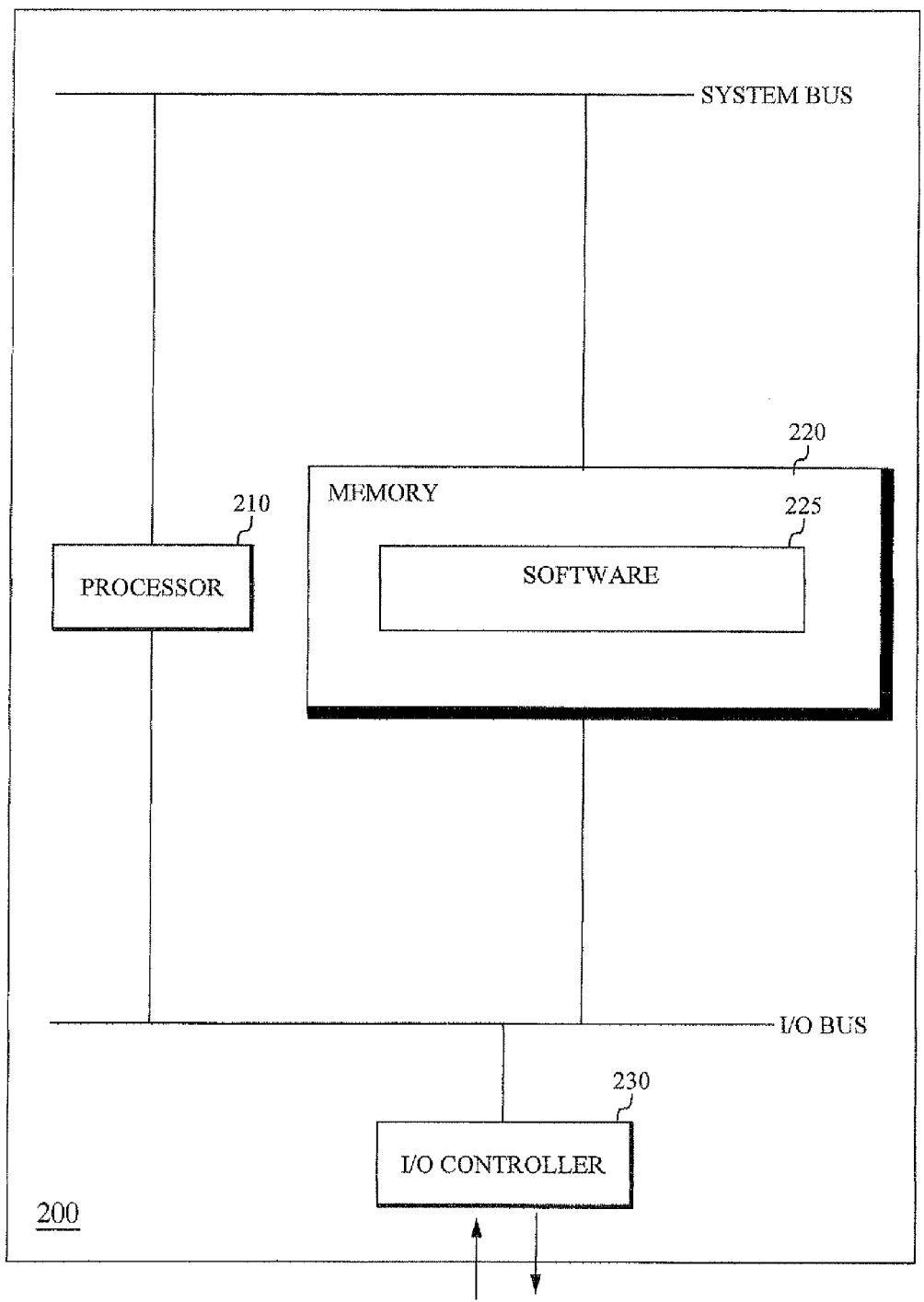
FIG. 10 illustrates a schematic block scheme of an embodiment of the present disclosure.

In the following, an example of a computer-implementation will be described with reference to FIG. 10. A computer 200 comprises a processor 210, an operating memory 220, and an input/output unit 230. In this particular example, at least some of the steps, functions, procedures, and/or blocks described above are implemented in software 225, which is loaded into the operating memory 220 for execution by the processor 210. The processor 210 and memory 220 are interconnected to each other via a system bus to enable normal software execution. The I/O unit 230 may be interconnected to the processor 210 and/or the memory 220 via an I/O bus to enable input and/or output of relevant data such as input parameter(s) and/or resulting output parameter(s).

Advantages of the embodiments of the present disclosure include overall improved system performance with IRC on high Doppler frequency channels, regardless of strong spatially correlated interference or then mal noise.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. Pat. No. 6,128,355, Selective diversity combining, Backman et. al.
[2] J. Lin, et al., "On Diagonal Loading for Robust Adaptive Beamforming Based on Worst-Case Performance optimization", ETRI Journal, Vol. 29, No 1, February 2007.

The invention claimed is:

1. A method of mitigating interference for received signals in a communication system, characterized by the steps of:
    receiving a transmitted signal via at least two antenna elements;
    estimating a channel for said received signals;
    estimating a disturbance covariance matrix based on said channel estimate, said estimated disturbance covariance matrix representing received interference plus noise of said received signals;
    adapting said estimated covariance matrix by enhancing the diagonal elements of said covariance matrix to provide an enhanced covariance matrix, to reduce the spread in the eigenvalues of said covariance matrix, and thereby improve the robustness of the covariance matrix;
    selectively using IRC and/or MRC to mitigate interference of said received signal, based on at least said channel estimate and on said enhanced covariance matrix, to provide a received signal with improved quality on channels with Doppler frequency.

2. The method according to claim 1, characterized by said adapting step comprising adding displacement values to the respective diagonal elements of the estimated covariance matrix.

3. The method according to claim 2, characterized by selecting said displacement values to be a constant.

4. The method according to claim 2, characterized by selecting said displacement values based on a power estimate of said received signals.

5. The method according to claim 2, characterized by selecting said displacement values based on an estimated Doppler frequency of said received signals.

6. The method according to claim 1, characterized by selecting and utilizing IRC or MRC based on a comparison of diagonal elements and non-diagonal elements.

7. The method according to claim 6, characterized by selecting and utilizing MRC and comprising the further step of compensating for the added displacement values of the diagonal elements of said covariance matrix.

8. The method of claim 1, characterized by initially selecting IRC or MRC based on said channel estimate and said disturbance covariance matrix, and only adapting said disturbance covariance matrix if IRC is selected.

9. The method according to claim 1, characterized by changing to and utilizing MRC based on a comparison of diagonal elements and non-diagonal elements of said enhanced disturbance covariance matrix.

10. An arrangement in a communication system, characterized by:
    a receiver configured to receive a signal via at least two antenna elements in said arrangement;
    a channel estimator configured to provide a channel estimate of said received signal;
    a disturbance estimator configured to provide an estimate of a disturbance covariance matrix of said channel estimate, said estimated disturbance covariance matrix representing interference plus noise of said channel estimate;
    an adaptation unit configured to adapt said covariance matrix estimate by enhancing the diagonal elements of said covariance matrix to provide an enhanced covariance matrix, to reduce the spread in the eigenvalues of said covariance matrix, and thereby improve the robustness of the covariance matrix;
    a IRC/MRC selector configured to selectively use IRC and/or MRC to mitigate interference of said received signal, based on at least said channel estimate and on said enhanced covariance matrix, to provide a received signal with improved quality on channels with Doppler frequency.

11. The arrangement according to claim 10, characterized in that said adaptation unit comprises a displacement determinator configured to add displacement values to the diagonal elements of said estimated covariance matrix.

12. The arrangement according to claim 11, characterized in that said displacement determinator is configured to select said displacement values based on a respective received power of said received signals.

13. The arrangement according to claim 11, characterized in that said displacement determinator is configured to select said displacement values based on a respective estimated Doppler frequency of said received signals.

14. A node in a communication system comprising an arrangement according to claim 10.

* * * * *

UNITED STATES PATENT AND TRADEMARK OFFICE
CERTIFICATE OF CORRECTION

| | |
|---|---|
| PATENT NO. | : 8,380,154 B2 |
| APPLICATION NO. | : 12/941121 |
| DATED | : February 19, 2013 |
| INVENTOR(S) | : Lindqvist et al. |

Page 1 of 2

It is certified that error appears in the above-identified patent and that said Letters Patent is hereby corrected as shown below:

In the Drawings

Fig. 4, Drawing Sheet 4 of 10, for Tag "S51", in Line 2, delete "CONVARIANCE" and insert -- COVARIANCE --, therefor.

Fig. 6, Drawing Sheet 6 of 10, delete "Λ" and insert -- A --, therefor.

In the Specification

Column 2, Line 21, delete "(IP)" and insert -- (TP) --, therefor.

Column 6, Line 31, delete " $\overline{\overline{H}}$ " and insert -- $\hat{\overline{H}}$ --, therefor.

Column 6, Line 34, in Equation "(8)", delete " $\hat{\overline{H}} = \overline{H} + \overline{H}_E$ " and insert -- $\hat{\overline{H}} = \overline{H} + \overline{H}_E$ --, therefor.

Column 6, Line 43, in Equation "(9)",
delete " $\hat{\overline{D}} = \overline{Y} - \hat{\overline{H}}X = \overline{H}X + \overline{D} - \hat{\overline{H}}X = \overline{D} - \overline{H}_E X$ " and
insert -- $\hat{\overline{D}} = \overline{Y} - \hat{\overline{H}}X = \overline{H}X + \overline{D} - \hat{\overline{H}}X = \overline{D} - \overline{H}_E X$ --, therefor.

Column 6, Line 48, in Equation "(10)", delete " $\hat{Q}_D = E\{\overline{\hat{D}\hat{D}^H}\}$ " and
insert -- $\hat{Q}_D = E\{\overline{\hat{D}\hat{D}^H}\}$ --, therefor.

Signed and Sealed this
Eighteenth Day of February, 2014

Michelle K. Lee
*Deputy Director of the United States Patent and Trademark Office*

Column 6, Line 51, delete "$\widetilde{C}_{IRC}$" and insert -- $\hat{C}_{IRC}$ --, therefor.

Column 10, Line 17, delete "unit 41 The" and insert -- unit 41. The --, therefor.

Column 11, Line 21, delete "then mal" and insert -- thermal --, therefor.